(No Model.)
H. STRATER.
BARREL VALVE.
No. 544,752. Patented Aug. 20, 1895.
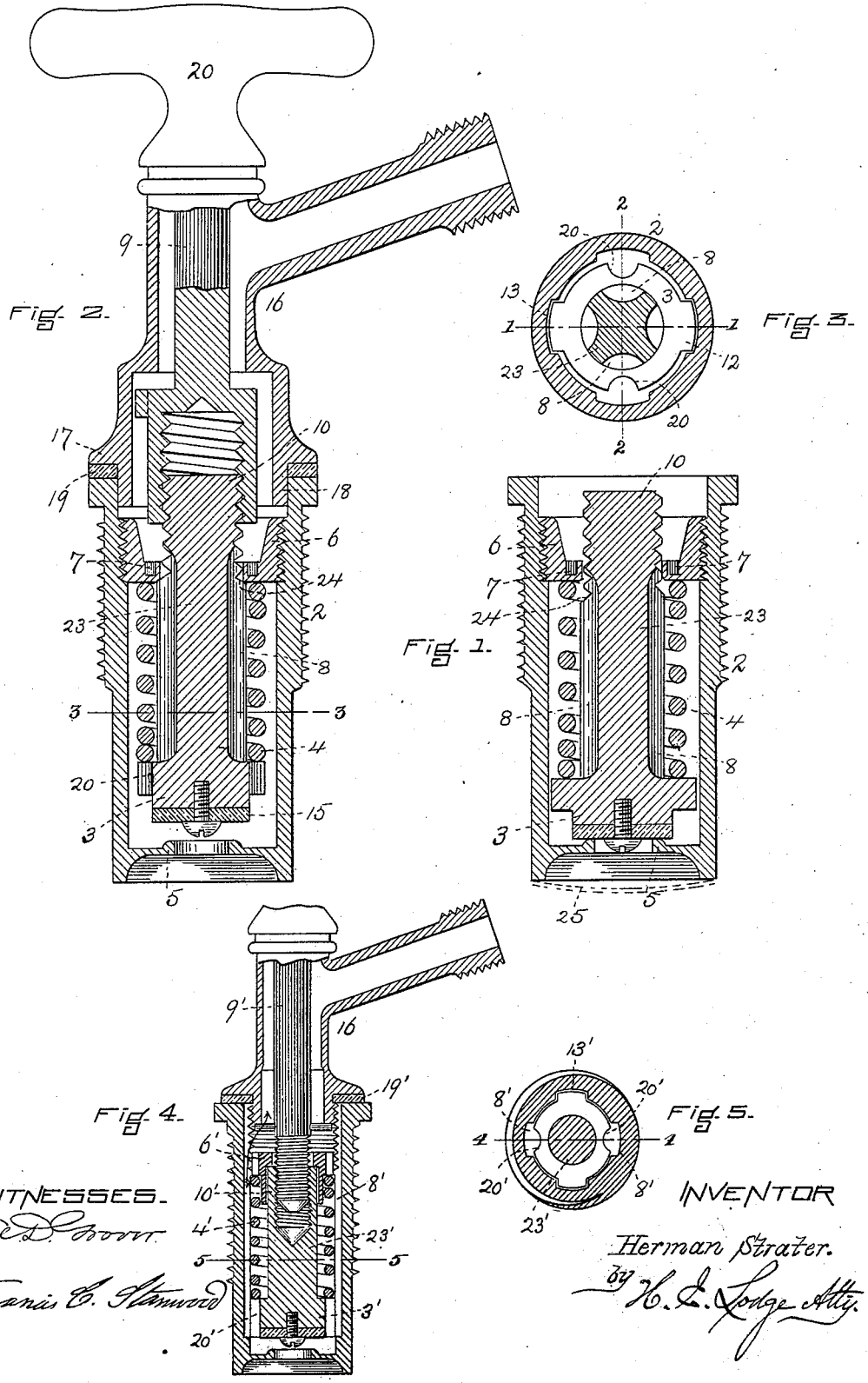
WITNESSES.
INVENTOR
Herman Strater.
by H. L. Lodge Atty.

UNITED STATES PATENT OFFICE.

HERMAN STRATER, OF BOSTON, MASSACHUSETTS.

BARREL-VALVE.

SPECIFICATION forming part of Letters Patent No. 544,752, dated August 20, 1895.

Application filed May 13, 1895. Serial No. 549,079. (No model.)

*To all whom it may concern:*

Be it known that I, HERMAN STRATER, a citizen of the United States, residing at Boston, in the county of Suffolk and State of Massachusetts, have invented certain new and useful Improvements in Barrel-Valves; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to a device for controlling liquid-discharge, or such elements as are applied at the tap-hole of barrels or similar storage-vessels. The desired characteristics of these "barrel-valves," so termed, require that they should close automatically and thus prevent the escape of the liquid contents; further, that they should be capable of union with a pipe system, in order that they may act to allow the contents to be easily discharged; and, lastly, in the act of uniting the valve with the pipe system, or in the opening or closing of said valve, that the contents cannot escape and be wasted.

The purpose and object of my invention are to embody all the above characteristics in a barrel-valve or liquid-dispensing device, which, in brief, comprises a valve to be closed at all times except when liquid is being drawn from the barrel; likewise in a separable valve-stem, which is connected with a pipe coupling or elbow, this latter uniting with a pipe system to the source of distribution.

One of the most important features in this invention is to provide for ready discharge of the liquid through the valve and at the same time have the external parts of the device fit snugly, and thereby not only conceal the ducts and openings for the flow of liquid, but likewise prevent dirt or foreign substances entering these passages at such times when the barrel is not in use or is being transported.

The peculiar construction, mode of operation, and other prominent features will be hereinafter fully described and explained.

The drawings represent, in Figure 1, a vertical longitudinal section on line 1 1 in Fig. 3 of a barrel-valve embodying my invention. Fig. 2 is a vertical longitudinal section of a barrel-valve united with a pipe system on line 2 2 in Fig. 3. Fig. 3 is a horizontal section of the barrel-valve on line 3 3 in Fig. 2. Fig. 4 is a vertical longitudinal section on line 4 4 in Fig. 5 of a modified form reduced. Fig. 5 is a horizontal section of the same on line 5 5 in Fig. 4.

In said drawings, 2 represents a flanged tube exteriorly screw-threaded for permanent attachment in the tap-hole of a barrel or analogous storage-vessel. This tube acts as a valve-casing and will be so termed for convenience of explanation, since it contains the valve 3, which controls the discharge of the liquid contents. Said valve is actuated by a spring 4, which is capable of withstanding any pressure within the barrel, and thus prevents their escape except at desired times. The valve rests upon the seat 5, which is at one end of the valve-casing and is apertured to connect with the interior of the barrel. The opposite end of the casing is interiorly screw-threaded to engage an annular nut 6, inserted in position by a spanner-wrench, the holes being indicated at 7 7, or otherwise. This nut regulates the tension of the spring 4.

In order to provide for free escape of liquid through the valve-casing, the periphery of the valve-shank is longitudinally grooved at 8 8, said grooves not extending the entire length, leaving the upper terminal portion 10 of the shank intact. This part is screw-threaded, as shown, and projects through the annular nut 6, for purposes hereinafter described. Thus, when the valve is lifted from its seat for the discharge of liquid, the shank moves through the nut 6 and the grooves now show upon the upper side of said nut. In this way ducts or openings are created for the escape of liquid through the bore of the valve-casing. To allow the liquid to pass the valve-head, recesses or openings 20 are created. (See Fig. 3.)

One of the peculiar features of this barrel-valve is a separable valve-stem. In other words, this valve is of such construction that when disconnected from a pipe system it is closed and cannot be operated or tampered with. When circumstances require discharge of the liquid contents, the valve-stem is attached and the valve opened. This valve-stem 9 engages a screw-threaded portion 10 on the valve-shank 23, while the valve-head is formed with lugs 12, which engage grooves 13. Hence the valve cannot turn when the valve-stem is connected with or disconnected from said valve. It will be observed that the extremity of the valve-shank in the position of the parts, as in Fig. 1, is free to slide through the annular nut 6. Thus, when the valve is closed, the terminal portion 10, circular in cross-section, snugly fits the central opening in the nut, and the entire exterior portion presents a smooth appearance with no apertures or recesses; but when the valve is raised the grooves 8 extend through the nut and passages for the escape of liquid are thereby created. Thus the nut not only co-operates with the valve-shank to allow discharge of the liquid, but it also serves to produce the proper tension on the spring, while the valve-shank is of such a length as to admit of engagement with the separable valve-stem, in order that the valve may be operated and opened fully, when it is so desired. A removable packing or gasket 15 on the head of the valve acts to maintain a tight joint and can be renewed when necessary.

In the discharge of the liquid contents of a barrel of ale or other malt liquors it is very necessary that the act of uniting said vessels with a delivery-pipe system should not be accompanied by loss of the contents. This frequently happens, owing to the high pressure within the barrels. The purpose of my invention is to enable this act to be accomplished quickly and readily and without such loss. In connection with this barrel-valve, as before stated, is a separable valve-stem, furnished with a handle 20 for convenience in use. This valve-stem forms part of a pipe-coupling, or preferably an elbow or Y 16, through one branch of which said valve-stem extends and engages the upper end of the valve-shank. It will be noticed that one end of said coupling is screw-threaded in order to interconnect with a pipe system. (Not shown.) The opposite end is furnished with a flange 17, while a lip 18, with a smooth periphery, or the extension of the coupling therebeyond, is adapted to enter the screw-threaded end of the valve-casing. A packing or gasket 19 is interposed between the outer end of the valve-casing and the flange of the coupling. Hence the coupling is swiveled about the valve-stem and is free to revolve, and thus may be placed in any position prior to the act of opening the valve, and can be turned even then without disturbing the other operating elements. In fact, it may be united with the pipe system prior to the attachment of the valve-stem and the opening of the valve.

In Figs. 4 and 5 I have shown slight changes in the construction, but these are evident modifications and embody the gist of my invention. In said drawings the passages for the escape of liquid occur exteriorly of the annular nut 6 instead of through it, as in Fig. 1. In order to create these ducts the interior walls of the valve-casing are longitudinally grooved at 8' 8', while the valve-head is cut away at points 20' 20', corresponding to said grooves, in order to increase the capacity for discharge. Furthermore, in lieu of the exteriorly-threaded extremity 10 on the valve-shank 3 a screw-threaded socket 10' is formed. However, these are merely alternative constructions; but such as is shown in Fig. 1 is preferred, since, as has been stated hereinbefore, the parts fit snugly and no opening or recesses are left exposed for the admission of foreign substances when the vessel is disconnected from the pipe-distributing system.

The operation of the above-described instrumentalities is as follows: In Fig. 1 the barrel-valve is in its normal closed position, the valve-casing being a fixture in the barrel, and the latter is in condition for transportation where the contents are to be drawn off. It is to be understood that the various parts comprising the barrel-valve are assembled prior to insertion in a barrel, a suitable spring being placed within the casing and the nut screwed down to a shoulder. Fig. 2 represents the various parts interconnected, with the valve open and the interior of the barrel united with a pipe system. This act is accomplished as follows: The valve-stem and coupling, preferably inseparably attached, are properly positioned, the valve-stem being united with the threaded shank portion 10 and revolved until the gasket 15 and flange 17 contact against the outer face of the valve-casing. The valve-stem is now still further revolved; but because the valve-stem can at present advance no farther upon the shank, since the coupling is in contact with the valve-casing, movement of the valve-stem now causes the valve to lift; but before the valve can open the tension of the spring 4 must be removed therefrom. Hence as the valve-stem is rotated the tension of said spring is gradually transferred from the valve proper to the joint between the flange 17 and the end of the valve-casing, thereby sealing this joint with the pressure of the spring equal to that which acted to prevent the escape of liquid past the valve. Hence it is evident no liquid or gas can escape at this point. As soon, however, as the valve-stem has raised the valve from its seat the liquid contents are free to escape through the grooves 8 8, said liquid flowing about the spring and between the grooves and the central opening in the nut, and after escaping through the annular nut it passes into the coupling and thence through the pipe system to the proper points of distribution. It will be understood that the valve-stem may be employed to open and close the valve, as would be done under ordinary conditions; but preferably said valve-stem is rotated until the shoulder 24 on the valve-shank is brought against the nut 6, which latter acts as a stop, and further rise of the valve is prevented. The valve is then wide open, and will so remain until the barrel is emptied, the discharge being controlled by a valve or valves at the source of distribution. It is to be understood that the diameter of the valve-shank below the screw-threaded portion is larger than the opening in the nut, for the following reasons: Firstly, the valve stem must engage with and separate from the valve-shank easily. Hence no taper occurs in the screw-threaded union between the valve-shank and the valve-stem. Secondly, by causing the valve-shank to act as a stop at a predetermined point undue compression upon the spring is prevented and the strength of the spring is not impaired, while at the same time by allowing the coils of the spring to remain some distance apart spaces are created for the passage of liquid about the spring and between it and the valve-shank. Lastly, when the upward lift of the valve and valve-shank is stopped by contact of the latter element with the nut, should greater pressure be needed upon the packing 19 the valve-stem may be further rotated, and any pressure desired may be thus produced without further compression of the spring. This is an important feature, since the life of the spring is prolonged, while any pressure in addition to that already produced by said spring may be applied upon the packing should occasion demand. After the liquid contents are all drawn off the valve-stem is given reverse motion and the valve is thrust positively toward the inner end of the valve-casing and seated thereupon. Further reverse rotation of the valve-stem transfers the pressure of the spring from the flange on the coupling to the valve itself, and subsequent rotation finally separates the valve-stem from the valve-shank, and said valve-stem, together with the coupling or Y, having performed their duties, are now disengaged and removed in readiness for attachment to a filled barrel. The empty barrel may now be transported to the place where the liquid, whatever it may be, is produced and re-charged. Thus it will be seen that the interior of the barrel is easily interconnected with a pipe system and no loss of the fluid contents can occur. The device is simple, positive, and not liable to get out of order, the only repairs being at times renewal of the valve-packing, as likewise that for the flange of the coupling. In order to prevent particles of dirt, sediment, or the dregs of the barrel from passing into or through the valve, a strainer 25 may be applied, as shown by the broken lines in Fig. 1 of the drawings.

What I claim is—

1. A liquid controlling device, as a duct for fluid discharge, comprising a tubular valve casing provided with a valve seat at one end and interiorly screw threaded at the opposite end, a non-revoluble valve having a threaded shank, an annular retaining nut, and passages for the flow of liquid through the valve casing, combined with a discharge pipe and a separable valve stem in said discharge pipe to engage the valve shank, said valve stem being adapted to revolve but having no endwise movement, substantially as explained.

2. A liquid controlling device which acts as a duct for fluid discharge, consisting of a valve casing interiorly screw threaded in part, a spring-actuated valve for rise and fall therein, an annular nut to adjust the spring tension, and a valve shank having an attenuated portion, said portion adapted to slide through the nut to permit fluid discharge when the valve is open, substantially as stated and set forth.

3. The combination with a valve casing, a non-revoluble spring-actuated valve, and a nut for adjusting the spring tension, of a tubular coupling adapted to form a sealed joint with the valve casing, and a valve stem secured to the coupling and separably united with the valve shank, substantially as described and stated.

4. In combination with a tubular valve casing interiorly and exteriorly screw-threaded in part, a valve within said casing, and a nut to limit the open movement of the valve, a revoluble coupling, and a valve stem secured to the coupling and adapted to engage the valve and transfer the spring tension from the valve to the flange of the coupling, substantially as specified.

5. A device for controlling the flow of liquid, comprising a valve casing as a fixture in the liquid containing vessel, a non-revoluble valve having a screw-threaded shank end, an annular nut in the bore of the casing, a spring to hold the valve closed, combined with a tubular coupling or Y, a valve stem separably united with the valve shank and revoluble in coupling, and passages for the flow of liquid from the vessel to the coupling when the valve is opened, substantially as described.

6. The combination with a valve casing, a spring actuated normally closed valve, an annular nut interiorly of the casing to control the spring tension, of a valve shank longitudinally grooved in part and to extend through the bore of the nut, a detachable discharge pipe to engage with the valve casing, and a revoluble valve stem mounted in said pipe to engage the valve shank and cause said shank to reciprocate through the nut, as set forth.

7. In a liquid controlling device adapted to serve as a duct from a source of supply to a discharge pipe system, a valve casing for attachment to the source of supply, a valve to close an aperture in the inner end of said casing, combined with an annular nut interiorly in the outer end of said casing, and a valve stem having a screw-threaded end adapted to slide through the nut and to seal the outer end of the valve chamber against the entrance of substances from without, substantially as stated.

8. A liquid controlling device consisting of a valve casing interiorly screw-threaded in part, a spring actuated valve for movements therein, a grooved valve head furnished with lugs, grooves longitudinally on the inner surface of the valve casing and adapted to cooperate with the grooves and the lugs on the valve head, together with means for uniting said device with a distributing pipe system, substantially as described.

9. A liquid controlling device comprising a tubular valve casing provided with a valve seat at one end, an annular nut interiorly near the opposite end, a non-revoluble valve, a valve shank to contact against the nut and limit the rise of the valve, a revoluble coupling, and a valve stem detachably united with the valve shank and adapted to force the coupling and valve casing together without rotary movement of the valve, as explained.

In testimony whereof I affix my signature in presence of two witnesses.

HERMAN STRATER.

Witnesses:
H. E. LODGE,
FRANCIS C. STANWOOD.